May 24, 1960

R. L. STEPHENSON ET AL 2,937,713

VACUUM CLEANER

Filed Jan. 11, 1957

INVENTORS
REVIS L. STEPHENSON
ELIAS H. DEWEY
BY
Curtis, Morris & Safford
ATTORNEYS

United States Patent Office 2,937,713
Patented May 24, 1960

2,937,713

VACUUM CLEANER

Revis L. Stephenson, Elmhurst, and Elias H. Dewey, Cazenovia, N.Y., assignors to United States Hoffman Machinery Corporation, New York, N.Y., a corporation of New York Filed Jan. 11, 1957, Ser. No. 633,669

3 Claims. (Cl. 183—89)

This invention relates to a large-capacity high-power vacuum cleaner suitable for removing small loose objects such as stones, metal scrap, and the like from jet aircraft runways, for example.

An object of this invention is to provide a vacuum cleaner which has enough suction and large enough capacity effectively to sweep from jet aircraft runways and landing fields any small loose objects which might otherwise be sucked into the aircraft jet engines.

A further object is to provide such a vacuum cleaner which is able to dispose of sharp metal objects and stones sucked up at very high speed without damage to itself so that it will have a long and efficient life.

Still another object is to provide a rugged but simple and relatively inexpensive vacuum cleaner of this kind.

These and other objects will in part be understood from and in part pointed out in the description given hereinafter.

A troublesome problem with present day jet aircraft is that of keeping foreign objects from being sucked into the aircraft engines. These engines act like giant vacuum cleaners, taking in vast quantities of air at high speed. Thus when a plane is landing or taking off its engines tend to sweep up debris, loose gravel, small pieces of metal scrap and the like from the airport runways. Such objects can cause as much damage to a jet engine as would anti-aircraft fire. Therefore it is now necessary to go to great lengths in being exceptionally careful to remove all loose small objects from jet aircraft landing fields.

In the past the task of keeping an airport swept clean of loose objects was expensive and tedious; it was very nearly a broom and dust pan operation. Self-propelled sweepers were developed but even these were slow and, perhaps more important, were not completely efficient in collecting loose small and heavy particles. Magnetic sweepers which use a powerful electro-magnet to pick up loose metal scrap will not pick up gravel or stones, for example. Moreover, magnetic sweepers fail to pick up non-magnetic metal such as aluminum and magnesium and thus fail to pick up parts made of these materials which, because of their increasingly widespread use in airplanes, now constitute an important and growing proportion of the scrap found lying about on landing fields.

Air suction or vacuum cleaners have been used at airports to sweep the runways but ordinary industrial cleaners are not entirely suitable. A vacuum cleaner to withstand this difficult kind of duty must be able to collect and dispose of hard, sharp, pointed, and sometimes sticky objects without damage to itself and without clogging. Ordinary vacuum cleaners frequently have insufficient suction to remove every loose stone, for example, that could be sucked up by a jet engine. Furthermore ordinary cleaners are quickly worn out by the abrading and the pounding of those hard objects which the in-drawn air current hurls into their dirt-collecting tanks. The present invention overcomes these deficiencies of prior vacuum cleaners and at the same time provides a structure which is simple and rugged and which can be made in very large size to have immense air suction capacity.

In accordance with the present invention there is provided as part of a very large vacuum cleaner, a refuse tank where dirt and even projectile-like metal objects such as machine bolts, for example, sucked into the tank, are easily and quickly separated from the high velocity air stream. These objects are trapped and collected in an easily accessible portion of the tank, and the residual air is exhausted to the atmosphere almost entirely free of even the finest dust particles.

A better understanding of the invention together with a fuller appreciation of its many advantages will best be gained from a study of the following description given in connection with the accompanying drawings in which.

Figure 1:
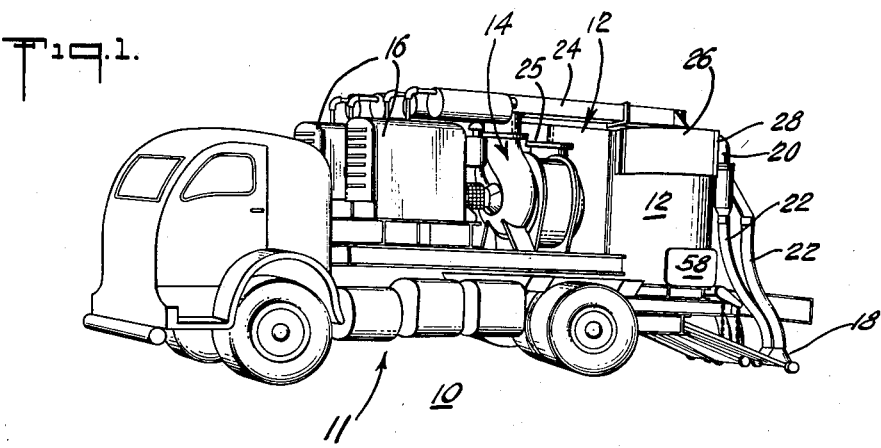
Figure 1 is a perspective view of a truck mounted vacuum cleaner embodying features of the invention.

The vacuum cleaner unit 10 seen in Figure 1 includes a truck chassis 11 upon which are mounted the dual elements of the vacuum cleaner. These elements include the right and left dust collecting tanks 12, the right and left centrifugal air pumps 14 and the right and left engines 16 which power the pumps 14. The set of right elements is substantially identical to the set of left elements and hence only one set will be described. At the rear of unit 10 pivotally suspended from the chassis of truck 11 are a number of suction nozzles 18 which roll along the ground and collect any loose objects over which they may pass.

Figure 2:
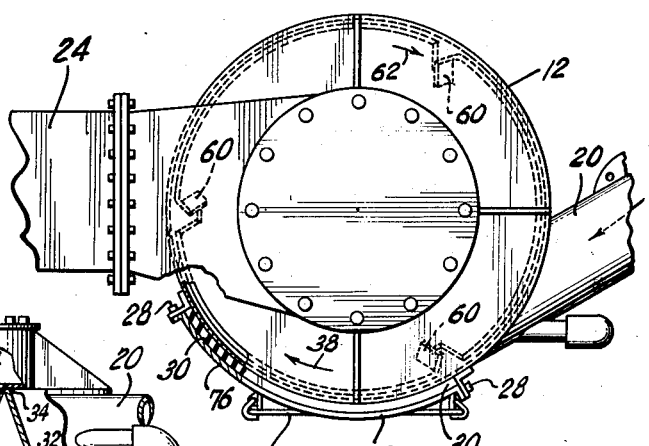
Figure 2 is an enlarged plan view partly broken away taken as indicated by the lines 2—2 in Figure 1 of one of the dust collecting tanks of the vacuum cleaner.

Figure 2 is a top view of the left dust tank 12 of unit 10. Air is admitted to the tank near its top through the pipe 20 which is connected at its other end by means of flexible hoses 22 seen in Figure 1 to the nozzles 18. Air is drawn from the top of tank 12 through the duct 24 which joins the tank to the air inlet port of the left air pump 14. Air is exhausted from the pump through a port 25. Pump 14 can be any standard centrifugal one that is commercially available. Air, ladened with any loose objects picked up by nozzles 18, is blown tangentially into tank 12 through pipe 20 at high velocity. This air impinges upon the inner wall of the tank over the area behind the outer cover plate 26, seen also in Figure 2, and which is removably fastened to the outside of the tank by the bolts 28. As can be seen, this plate curves around a portion of the tank across from and in front of the inner opening of pipe 20. Sandwiched between plate 26 and the outer wall of tank 12 is a wear pad 30 made of any suitable material such as abrasion resistant rubber.

During operation of vacuum cleaner 10, the abrasive action of the dirt and particle ladened air blown from pipe 20 quickly wears through the relatively thin wall of tank 12 behind cover plate 26. This exposes a portion of pad 30 and, thereafter the loose material carried by the air impinges upon this wear pad, which as previously mentioned is highly resistant to abrasion. The hole which is eroded through the wall of tank 12 underneath pad 30 is naturally formed and its edges are thus smooth and free of any discontinuities. This eliminates the need for cutting a hole for pad 30 during fabrication of the unit thus simplifying the installation of the pad. Though the wall of tank 12 beneath this pad is relatively quickly worn through, a given pad 30 will have a long life. Moreover a new pad can be easily installed from time to time.

Figure 3:
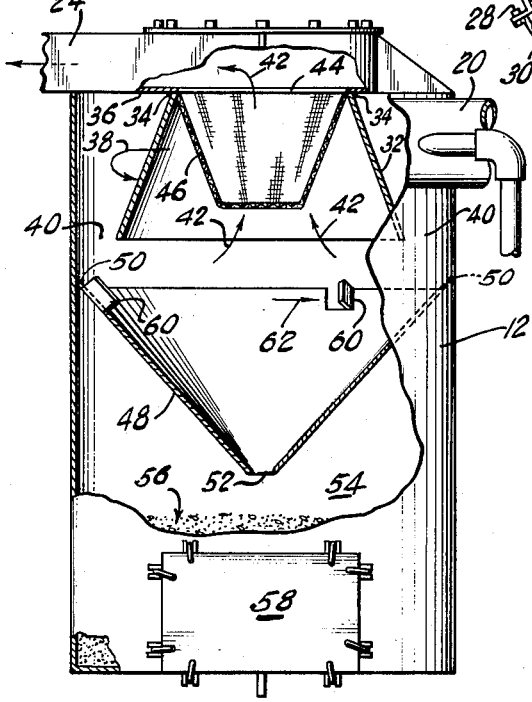
Figure 3 is a side view partly in cross-section of the duct collecting tank of Figure 2.

As seen in Figure 3 the air which enters tank 12 through pipe 20 is confined initially to an annular or circumferential zone in the top of the tank by the cone section 32. This cone section is welded around its circular top edge at 34 to the disk-like plate 36 which closes the top of tank 12. Viewing tank 12 from the top, as in Figure 2, air enters it through pipe 20 and moves clockwise in the direction of the arrow 38. As the air circles around cone section 32 it moves downward and passes around the lower edge of the cone section through the annular opening 40 into the center part of the tank. Here, the heavier solid particles in the air continue to move downward under gravity and their own velocity while the less burdened air, which is thus separated from the dirt entrained in it, is sucked upward in the direction of arrows 42. The filtered air passes in the direction of arrows 42 through a central opening 44 in plate 36 and into exhaust duct 24. To prevent any lightweight trash, such as leaves or paper, from passing along with the air out of tank 12, a basket-like filter screen 46 is placed beneath opening 44.

Positioned beneath the cone section 32 is a cone shaped funnel 48. This funnel at its top edge 50 is welded to the inner wall of tank 12. At the bottom of funnel 48 is the relatively small hole 52 which opens into a dead air space 54 within the lower part of tank 12. The solid material, such as tht indicated by numeral 56, which was separated from the air drawn into the tank is collected in the lower part of this air space 54. Near the bottom of this space at one side is a door 58 which is removable to permit cleaning out of the accumulated dirt and trash.

Spaced around the top edge of funnel 48 are the three dirt scoops or tabs 60. These tabs are advantageously formed by punching up a portion of the wall of funnel 48 to approximately a 45° angle. Thus as seen in Figures 2 and 3 solid material spinning around the top of funnel 48 in the direction of arrow 62 can impinge upon any one of the scoops 60 and be shunted through it directly down into the dead air space 54. By virtue of these scoops 60, much of the solid material spinning at high velocity in tank 12 will be quickly shunted into dead air space 54, the rest of the material being deposited therein through hole 52 at the bottom of funnel 48. The efficiency of this arrangement in separating solid material from the air stream is so great that even very fine dust is collected in the lower part of tank 12 and practically none escapes through exhaust duct 24. The air which is exhausted from the tank is therefore clean and is entirely free of those heavier objects such as metal, scrap and loose stones which might otherwise be dangerous.

The relative sizes of the elements within tank 12 are advantageously as follows: internal diameter of tank 12, 48 inches, internal height of tank 12, 70 inches; height of cone section 32, 18 inches; small end of cone section 32, 22 inches diameter; large end of cone section 32, 36 inches diameter; distance between bottom edge of section 32 and top edge of funnel 48, 6 inches; diameter of hole 52, 3 inches; height of funnel 48, 21 inches.

The above description of the invention is intended in illustration and not in limitation thereof. Various changes may occur to those skilled in the art and these may be made without departing from the spirit or scope of the invention as set forth.

We claim:

1. A dust tank of the character described comprising, a cylindrical tank, an air inlet pipe opening tangentially through the outer wall of said tank, an air exhaust vent extending from said tank, filtering means within said tank between said inlet pipe and exhaust vent for separating solid material entrained in the air blowing from said inlet pipe, a removable cover plate positioned around the outside of said tank across and in front of the inner open end of said pipe, and an abrasion resistant wear pad of resilient material sandwiched between said cover plate and the wall of said tank whereby when abrasive material carried by the air entering said tank through said pipe wears through the wall of said tank, said wear pad will be exposed and the wall of said tank will be worn smooth and free of irregularities without the need for machining or fitting during fabrication.

2. A dust tank for separating heavy objects entrained in a stream of air traveling at high velocity, said tank comprising a cylindrical outer wall having top and bottom covers, an air inlet pipe opening tangentially into the side of said tank near the top thereof, a cone section having its small diameter end fastened to said top cover and extending downwardly beyond said pipe with its large diameter bottom edge being slightly less in diameter than the inside diameter of said tank outer wall, a funnel having its top edge fastened circumferentially around the inside of said tank wall slightly below the bottom edge of said cone section and having in its lower end a small diameter hole opening to a dead air space within the lower part of said tank, and an abrasion resistant wear pad removably positioned around the outside of said tank outer wall across and in front the inner opening of said inlet pipe.

3. The structure as in claim 2 wherein said wear pad is made of abrasion resistant rubber which is squeezed against said tank outer wall by a removable plate.

References Cited in the file of this patent

UNITED STATES PATENTS

| | | |
|---|---|---|
| 514,677 | Furnas | Feb. 13, 1894 |
| 1,015,637 | Roby | Jan. 23, 1912 |
| 1,124,603 | Furnas | Jan. 12, 1915 |
| 1,229,737 | Furnas | June 12, 1917 |
| 1,252,905 | Johnson | Jan. 8, 1918 |
| 1,933,730 | Gredell | Nov. 7, 1933 |
| 1,944,976 | Hamilton | Jan. 30, 1934 |
| 2,114,786 | Schneible | Apr. 19, 1938 |
| 2,131,398 | Hubbart | Sept. 27, 1938 |
| 2,349,831 | Osgood | May 30, 1944 |
| 2,523,808 | Boyce | Sept. 26, 1950 |

FOREIGN PATENTS

| | | |
|---|---|---|
| 334,976 | Germany | Mar. 23, 1921 |
| 344,274 | Great Britain | Mar. 5, 1931 |
| 108,470 | Sweden | Sept. 14, 1943 |